United States Patent [19]
Kleinschmit et al.

[11] 3,762,824
[45] Oct. 2, 1973

[54] CROSS GUIDE MEMBER, PREFERABLY FOR MOTOR VEHICLES

[75] Inventors: Einhard Kleinschmit; Wolfhard Konig, both of Stuttgart, Germany

[73] Assignee: Daimler-Benz Aktiengesellschaft, Stuttgart-Unterburkheim, Germany

[22] Filed: Sept. 23, 1971

[21] Appl. No.: 183,167

[52] U.S. Cl. .................................. 403/133
[51] Int. Cl. ............................. F16c 11/06
[58] Field of Search ............... 287/90 R, 90 C, 87

[56] References Cited
UNITED STATES PATENTS
3,165,343  1/1965  Gottschald ........................... 287/87

Figure 1:
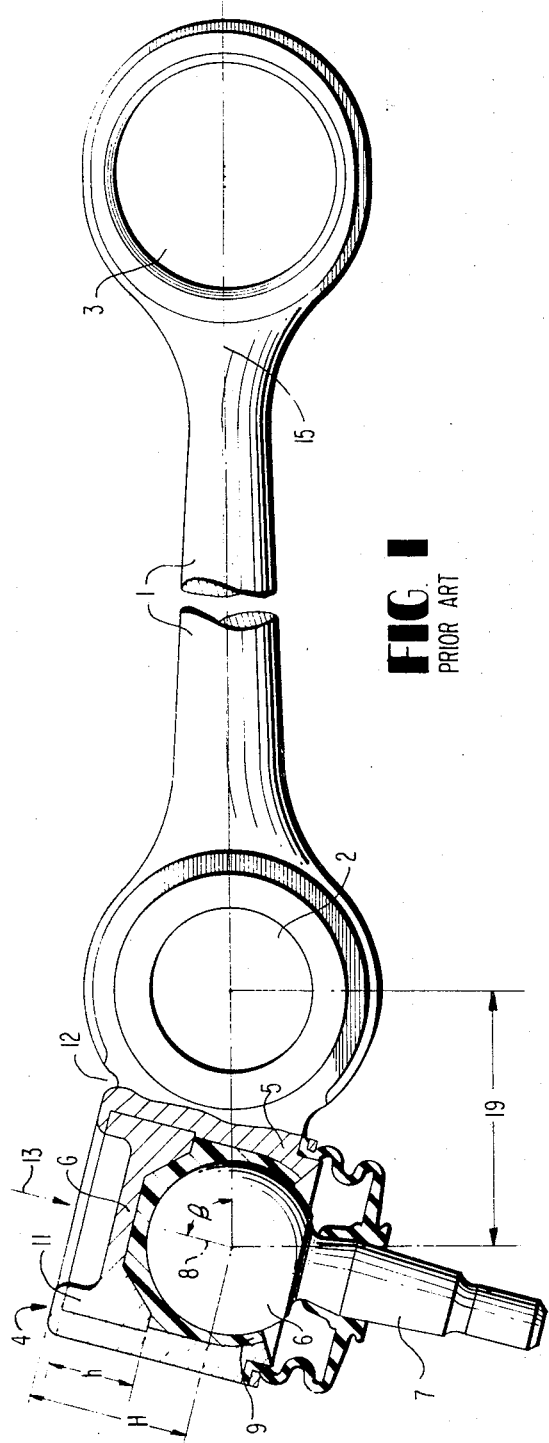

OTHER PUBLICATIONS
Figure 1 Designated as Prior Art in Application Ser. No. 183,167.

Primary Examiner—Andrew V. Kundrat
Attorney—Craig, Antonelli & Hill

[57] ABSTRACT

A cross guide member, joint lever, tie-rod or the like, preferably for motor vehicle, which includes at least one eye in a guide member for a pivotal connection and a guide joint adjacent the eye for a ball whose joint bolt, in the center position of the ball, forms with the longitudinal axis of the guide member in a plane perpendicular to the axis of the eye, an angle that is larger than a right angle and which is retained in the guide joint by a rolled-in housing cover; the guide joint is thereby so constructed that the assembly and rolling direction of the housing cover on the side opposite the ball joint bolt, forms with the longitudinal axis of the guide member a larger angle than is formed between the ball joint bolt axis, when in its center position, and the same longitudinal axis.

5 Claims, 2 Drawing Figures

PATENTED OCT 2 1973  3,762,824

INVENTORS
EINHARD KLEINSCHMIT
WOLFHARD KÖNIG

BY Craig, Antonelli & Hill
ATTORNEYS

CROSS GUIDE MEMBER, PREFERABLY FOR MOTOR VEHICLES

The present invention relates to a cross guide member, preferably for a motor vehicle, with at least one eye for a pivotal connection and with a guide joint adjacent the eye for a ball, whose joint bolt in the center position of the ball forms with the longitudinal axis of the guide member in a plane perpendicular to the axis of the eye, an angle larger than a right angle and which is retained in the guide joint by rolling-in a housing cover.

With the heretofore known constructions of this type of cross guide members having a small distance between the ball joint and a point of force introduction constructed as eye, it was customary to symmetrically construct the guide joint housing and the parts disposed therein with respect to the center position of the joint bolt of the ball and a synthetic bearing means far-reachingly surrounding the ball. By reason of the required machining and of the space required for the rolling-in operation of the housing cover, certain minimum distances and dimensions were necessary for the guide joint housing. These minimum dimensions, taking into consideration the directly adjacent eye and the space requirement necessary for the machining and assembly, also resulted in relatively large structural heights for the guide joint housing and therewith also for the housing cover which had to be manufactured analogously as a machined or turned part.

It is the aim of the present invention to avoid the disadvantages resulting from the relatively large structural height of the guide joint housing and to reduce its external dimensions in order to gain simultaneously space for the installation of the cross guide member within relatively small spaces.

The underlying problems are solved according to the present invention by such a construction of the guide joint that the assembly and rolling-in direction of the housing cover on the side opposite the ball joint bolt forms with the longitudinal axis of the guide member a larger angle than is formed between the ball joint bolt axis forms and the same longitudinal axis. According to a further feature of the present invention, the angular difference may amount to about 35°. By this construction of the guide joint, the housing cover which abuts at a plastic bearing means far-reachingly surrounding the ball and constructed asymmetrically corresponding to the angular difference and thus retains the ball with its bearing means in the guide joint housing, can be stamped out advantageously of sheet metal with uniform wall thickness.

Accordingly, it is an object of the present invention to provide a cross guide member or the like, especially for motor vehicles, which avoids by simple means the aforementioned shortcomings and drawbacks encountered in the prior art constructions.

Another object of the present invention resides in a cross guide or the like which reduces the external dimensions, in particular of the guide joint housing, and simplifies both manufacture and assembly.

Still a further object of the present invention resides in a cross guide member, particularly for motor vehicles, which minimizes machining operations and facilitates assembly.

A further object of the present invention resides in a cross guide structure or the like of the type described above which results in considerable space saving, thereby permitting installation thereof within relatively small spaces.

Figure 2:
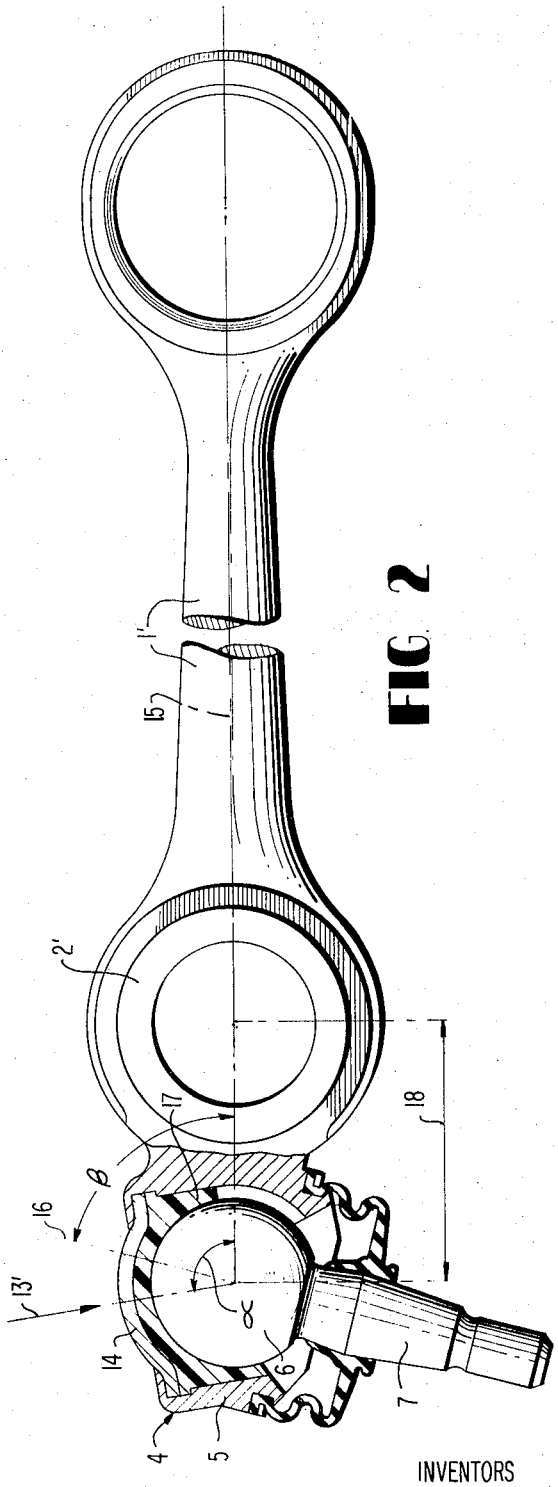

These and further objects, features and advantages of the present invention will become more apparent from the following description when taken in connection with the accompanying drawing which shows, for purposes of illustration only, one prior art embodiment and one embodiment in accordance with the present invention, and wherein FIG. 1 is a partial cross sectional view of a cross guide member of the prior art, and FIG. 2 is a partial cross sectional view of a cross guide member in accordance with the present invention.

Referring now to the drawing wherein like reference numerals are used throughout the two views to designate like parts, and more particularly to FIG. 1, the heretofore known cross guide member, as used in the prior art, includes two eyes 2 and 3 as force-introduction points and, in proximity of the eye 2, a ball joint generally designated by reference numeral 4 as guide joint. This ball joint 4 includes a housing 5 into which is inserted a ball 6 with a joint bolt 7 in the direction of its longitudinal axis 8, i.e., of the assembly direction thereof. The ball 6 is far-reachingly surrounded by a symmetrically constructed synthetic bearing 9, preferably of acetal resins of conventional type used normally for that purpose. A housing cover 11 abuts at the plastic bearing 4, which retains the ball 6 with its bearing means 9 within the guide joint housing 5. For reasons of the metal-removing machining operation of the ball housing 5, preferably in the interior thereof, and by reason of the space necessitated for the rolling-in of the housing cover G, it is necessary to construct the housing as well as the cover relatively high. In FIG. 1 a recess 12 is illustrated which is additionally necessary in order to realize sufficient space for the emplacement of the rolling-in die. From this follows, on the one hand, that a certain distance has to be maintained between the eye 2 and the ball joint 4 and, on the other, relatively large structural heights H and h for the ball joint housing 5 and the housing cover 11 are necessary.

Since for the installation of a cross guide member in a motor vehicle, especially within the area of the ball joint, relatively little space is normally available, it was the task of the present invention to reduce the dimensions of the ball joint in some manner. It was proposed according to the present invention for that purpose to change the assembly direction 13 for the insertion of the ball together with the synthetic bearing and the housing cover and to thereby gain space for the mounting of the rolling-in apparatus notwithstanding small structural dimensions.

FIG. 2 illustrates an embodiment according to the present invention of a cross guide member 1', in which the assembly and rolling-in direction 13' of the housing cover 14 on the side opposite the ball joint bolt 7 forms with the longitudinal axis 15 of the guide member 1' a larger angle α than the ball joint bolt axis 16 forms with the same longitudinal axis 15 (angle β). The angle β subtended by the ball joint bolt axis 16 and the longitudinal axis 15 is, as can be readily seen from FIG. 2, smaller than the angle α. The angle difference between two angles (α − β) amounts to about 35°. In the embodiment illustrated in FIG. 2, the plastic bearing 17 far-reachingly surrounding the ball 6 is constructed asymmetrically corresponding to the angular difference. The rolled-in housing cover 14 seated on this plastic bearing 17 may be stamped out from simple sheet metal material with uniform wall thickness and has a considerably smaller height than the originally utilized housing cover 11.

By the construction of the cross guide member according to the present invention, not only the structural heights of the guide joint and of the housing cover can be reduced and the latter can be made from sheet metal by simple stamping operation, but also the distance 18 (FIG. 2) between the center of the ball 6 and of the eye 2' can be reduced compared to the distance 19 (FIG. 1) between the two corresponding points of the prior art construction.

While we have shown and described only one embodiment in accordance with the present invention, it is understood that the same is not limited thereto but is susceptible of numerous changes and modifications as known to those skilled in the art. For example, the present invention can be applied not only in connection with cross guide members but also in connection with joint levers, tie-rods, or the like. Accordingly, we do not wish to be limited to the details shown and described herein but intend to cover all such changes and modifications as are encompassed by the scope of the appended claims.

What we claim is:

1. A guide structure with at least one eye means for a pivotal connection with a guide joint means for a ball adjacent the eye means, said ball having a joint bolt which in the center position thereof forms with the longitudinal axis of the guide structure, in a plane perpendicular to the axis of the eye means, an angle larger than a right angle, a housing cover means for retaining the ball in the guide joint means, said ball being retained in the guide joint means by rolling-in the housing cover wherein the assembly and rolling-in direction of the housing cover on the side opposite the ball joint forms a first angle with the longitudinal axis of the guide structure that is larger than a second angle formed between the ball joint axis in the center position thereof with said longitudinal axis of the guide structure, a plastic bearing means is provided surrounding the ball and constructed assymmetrically corresponding to the angular difference between said first and second angles, and said rolled-in housing cover abuts said plastic bearing means and is a stamping from sheet metal with a uniform thickness.

2. A guide structure according to claim 1, characterized in that the guide structure is a cross guide member for a motor vehicle.

3. A guide structure according to claim 1, characterized in that the guide structure is a joint lever.

4. A guide structure according to claim 1, characterized in that the guide structure is a tie-rod.

5. A guide structure according to claim 1, characterized in that the angular difference amounts to about 35°.

* * * * *

UNITED STATES PATENT OFFICE
CERTIFICATE OF CORRECTION

Patent No. 3,762,824                    Dated October 2, 1973

Inventor(s) Einhard Kleinschmit and Wolfhard Konig

It is certified that error appears in the above-identified patent and that said Letters Patent are hereby corrected as shown below:

Title Page, insert the following:

[30][1]    Foreign Application Priority Data

September 25, 1970    Germany    P 20 47 194.7

Signed and sealed this 2nd day of April 1974.

(SEAL)
Attest:

EDWARD M. FLETCHER, JR.            C. MARSHALL DANN
Attesting Officer                  Commissioner of Patents